United States Patent [19]

Weitman

[11] Patent Number: 4,519,440
[45] Date of Patent: May 28, 1985

[54] METHOD FOR HEAT RECOVERY

[76] Inventor: Jacob Weitman, Tryffelstigen 8, S-611 63 Nykoping, Sweden

[21] Appl. No.: 380,732

[22] PCT Filed: Sep. 11, 1981

[86] PCT No.: PCT/SE81/00257
§ 371 Date: May 12, 1982
§ 102(e) Date: May 12, 1982

[87] PCT Pub. No.: WO82/01059
PCT Pub. Date: Apr. 1, 1982

[30] Foreign Application Priority Data

Sep. 12, 1980 [SE] Sweden ................................. 8006392

[51] Int. Cl.³ .......................... F24H 7/04; F28D 15/00
[52] U.S. Cl. ........................................... 165/1; 165/18; 165/47; 165/104.11; 165/DIG. 4; 165/DIG. 12
[58] Field of Search ................. 165/DIG. 12, DIG. 4, 165/146, 18, 104.11 A, 48, 47 R, 47 W, 47 BW, 1, 2

[56] References Cited

U.S. PATENT DOCUMENTS

| 3,623,549 | 11/1971 | Smith, Jr. ............................. 165/146 |
| 3,996,759 | 12/1976 | Meckler ............................. 165/18 X |
| 4,190,099 | 2/1980 | Despois et al. ................ 165/DIG. 4 |
| 4,332,290 | 6/1982 | Skala .......................... 165/104.11 A |
| 4,402,188 | 9/1983 | Skala ............................... 165/18 X |

FOREIGN PATENT DOCUMENTS

2416294 4/1974 Fed. Rep. of Germany ... 165/DIG. 12

Primary Examiner—Sheldon J. Richter
Attorney, Agent, or Firm—Lewis H. Eslinger

[57] ABSTRACT

A method and an apparatus for the heat recovery from plants in which waste heat is produced at different waste heat sources and fluids are emitted at different temperatures, said method and said apparatus striving after a total optimization of the heat recovery without efficiency losses caused by missing instantaneous compensation between the amount produced waste heat and the need thereof. Said method comprising the steps of collecting waste heat in emitted fluid or fluids at every waste heat source of group of mutually similar waste heat sources and assorting said waste heat with regard to temperatures and as required accumulate it at the highest temperature as possible. Collected heat is then fed back directly or indirectly via the accumulators to the heat requiring unit the temperature need of which is with as low value as possible below the temperature of the feed-back heat. Said apparatus is characterized in that said waste heat sources ($M_1$-$M_4$) are in groups connected with heat collecting devices which by temperature controlled change-over devices ($O_1$) are connected with heat accumulators ($A_1$-$A_3$), said heat consuming units ($M_1$, $M_3$, $M_5$, LU, TVV), being connected with these by means of change-over devices ($O_2$) in such a way that every heat consumer is connected with the heat source the temperature of which with as low value as possible increases the temperature need in the heat consumer.

6 Claims, 7 Drawing Figures

METHOD FOR HEAT RECOVERY

The invention is related to a method and an apparatus for heat recovery in which waste heat is produced at different heat sources and temperatures, said method and said apparatus being so formed that total optimization can be obtained.

In many industries in which energy intensive processes and machines are used, in the paper-, textile- and washing industry for instance, significant amounts of energy are emitted to the environment with exhaust liquids, moisty outlet gases and different cooling mediums.

In such situations in which in order to save energy equipments for energy recovery are put in, the traditional way is to form this equipment to be used between emitted and supplied fluids, whereby a heat exchange occurs at a single machine or possibly a group of mutually similar machines.

On thermodynamical principles it follows that heat energy at a high temperature can be seen as higher "quality" than heat energy at a lower temperature. The conventional heat recovery often does not either give any opportunity to supply recovered waste heat to a process step with the exact high "quality" which is needed. Hereby follows that even if the totally recovered energy amount at a machine easily should be sufficient, there is in practice no possibility to this, since perhaps the recovered heat has a too low temperature.

Heat recovery often has the effect that simultaneousness must exist regarding the emitting of waste heat and the need thereof. For example, in a machine which has great thermal inertia and which after an operation stop must be cooled during a proportionately long period, the free waste heat cannot be re-used if the heat recovery only occurs locally, since any corresponding heat need to the machine does not exist after it has been stopped. Hence, the traditional local heat recovery means difficulties to with regard to the time compensate the supply of waste heat and the need thereof.

A method to recover heat from exhaust water which is supplied to a heat exchanger is previously known from e.g. SE-PS 382 496. When the temperature of the supplied exhaust water is below the temperature of the exhaust water in the heat exchanger the supplied exhaust water is by-passed the heat exchanger.

This method to recover heat from exhaust water is heat wasting for the reason that a great portion of the heat in the exhaust water is by-passed directly the heat exchanger and is therefore not recovered.

It is an object of this invention to provide a method for the recovery of heat from a process in which fluids are emitted at different temperatures from several waste heat sources, said method being defined to avoid the drawbacks mentioned above, i.e. to obtain a total optimization of the heat recovery, and simultaneously to increase the accessibility for waste heat and the use of the apparatus.

This object is attained according to the invention by the fact that the waste heat in said fluids is collected from every waste heat source or from mutually similar waste heat sources, that collected waste heat is assorted with regard to temperature and is then fed back to the system and/or a further consumer, said feedback being provided at a temperature as low as possible with regard to the application thereof.

To compensate varying need of waste heat values, but even varying medium flows from waste heat sources, collected waste heat values can be accumulated at the highest possible of a number of predetermined temperatures.

At a modified embodiment of the method according to the invention said collecting can be achieved by heat exchanging from the fluid of the waste heat source to a heat carrying fluid.

Another modified embodiment implies a direct discharge of a heat carrying fluid.

The invention is also related to an apparatus for executing said method, which apparatus comprises a number of waste heat sources with fluid outlets, especially of different temperatures, said apparatus being characterized by the fact that the fluid outlets dependent on the fluid and the temperature thereof, are to be connected to each other in groups connected with a heat collecting device each, said heat collecting devices being connected with heat consumers included in said system in such a way that the temperature necessary in said heat consumer with a value as low as possible is below accessible temperature in the heat collecting device connected therewith.

A practical embodiment of said apparatus according to the invention is further characterized by the fact that it comprises a number of heat accumulators with different temperatures, each heat collecting device being connected with the heat accumulator in which the temperature with a value as low as possible is below the temperature in the heat collecting device and by the fact that the heat accumulators are connected with consumers included in said system.

In systems or processes in which temperatures from one and the same machine can vary in a relatively great temperature interval, a higher efficiency is obtained than in the case that a change-over device is provided for connection with a certain heat accumulator dependent on instantaneously existing temperatures.

For a better understanding of this invention reference is made to the following description, taken in connection with the accompanying drawings.

The invention is based on the fundamental idea that waste heat is to be regarded as an energy raw product which is systematically collected from a process and is assorted dependent on temperature and the type of heat carrying fluid which, possibly after work up, is fed back to the plant in such a way that the quality as close as possible corresponds to the requirements of heat quality in the heat consuming machine. In the basic inventive idea it is also included the requirements of a compensation of time as well the fluids as the access to and the demand for produced waste heat which in practice means the occurrence of heat accumulators which have different temperatures. Possibly, there are devices for the supply of additional heat.

Figure 1:
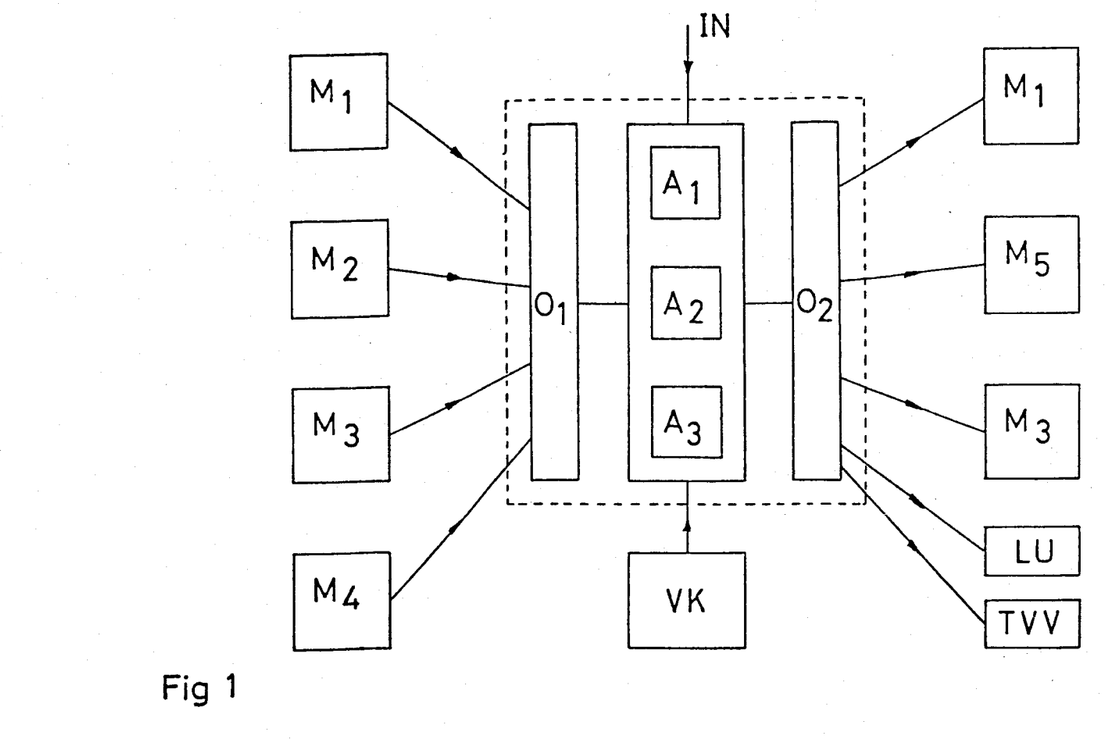
FIG. 1 shows a block scheme of the basic principle of the invention.

In FIG. 1 as a block diagram the basic principle of the invention is shown. Four units $M_1$, $M_2$, $M_3$ and $M_4$ represent waste heat sources which can exist in a washing, textile or paper pulp industry for instance. Said units can consist of separate process steps or groups of similar machines. The expression "similar" means, in this connection, that emitted waste heat is carried of one single medium at approximately the same temperature.

The units $M_1$, $M_5$, $M_3$, LU and TVV shown to the right in FIG. 1 represent heat consumers, said units $M_1$ and $M_3$ being able to coincide with the units shown at the left in FIG. 1 with the same references, while the unit $M_5$ is a unit which consumes but not produces waste heat. In the same way the units LU and TVV only consume heat but are not themselves producing any heat. The reference LU means local heating and the reference TVV means tapping hot water.

The part within the rectangle indicated by dashed lines can be regarded as a central unit and includes heat accumulators, in the shown embodiment three accumulators $A_1$, $A_2$ and $A_3$, said heat accumulators working at different temperatures. Further, the central unit comprises two change-over devices of which the one on the left hand $O_1$ has as an object to connect the waste heat sources $M_1$–$M_4$ with the heat accumulators $A_1$–$A_3$ in such a way that the waste heat source is connected with the accumulator which with as low value as possible is below the temperature of the heat emitted from the waste heat source. In the corresponding way the other change-over device $O_2$ has as an object to connect the heat accumulators $A_1$–$A_3$ with the heat consumers $M_1$, $M_5$, $M_3$, LU and TVV shown in such a way that heat consumers are connected with heat accumulators where the temperature with as small value as possible is below the requested temperature in the heat consumer.

The central unit can also be connected with an outer heat source VK, which supplies the net energy which is not produced by the heat recovery. Moreover, inlets for admitted fluids are preferably connected with the central unit, which inlets are represented by the reference IN. Finally the central unit comprises, as desired, heat exchanger equipments and control equipments.

Regarding the change-over devices $O_1$ and $O_2$ it can be said that they partily can consist of fixed line connections between the units $M_1$–$M_5$ and LU and TVV which is of current interest when the units have constant temperatures with regard to the time at admitted as well as at required supplied heat. In certain situations one or some units work with varying temperatures which is exemplified by a washing machine which is working with pre-washing, main-washing and rinsing. In such a situation change-over can be required of the heat emitting unit to different heat accumulators. In a similar way the requirements of temperature at a heat consumer can vary with regard to the time and an active change-over between the different heat accumulators can be required.

In many cases heat carrying mediums emitted from the waste heat source can be led to the central unit, be assorted there dependent on the temperature and thereafter be supplied to the respective heat accumulator. In other situations the heat carrying medium from the waste heat sources cannot due to its physical characteristics be stored directly in the heat accumulators, and in such cases a heat exchanger is connected between the waste heat source and the central unit. As an example a waste heat source can emit heated flows of moist air.

$M_1$ and $M_3$ are units which both emit and require heat. If the temperatures of the emitted and supplied heat fairly correspond to each other, according to the invention, nothing obstructs that a local heat exchange is provided between the supplied and emitted fluids to these units. Possible net energy need is supplied to or emitted from the central unit. $M_2$ and $M_4$ are units which produce waste heat but have not a heat demand which must be satisfied from the central unit. $M_5$ is a unit which consumes waste heat from the central unit but does not emit any heat energy in such a way that this heat energy can be taken care of. The same conditions are applicable on the local heating LU and the tapping hot water TVV which even does not supply the central unit with any waste heat.

The most important point has been directed on the static characteristics of the invention, i.e. the capacity of transferring waste heat from one or many sources to one or many heat consumers in such a way that temperatures "as close as possible fit to each other". The use of the central unit with the heat accumulators also means that a dynamic system has been created, whereby variations on emitted heat amounts and flows of fluids and required such heat amounts does not any longer mean any diminishing of the recovery efficiency. By means of the energy accumulators of the central unit and the connection of the central unit with an outer heat source no requirements of instantaneously compensation between waste heat production and energy consumption occurs. Instead, waste heat is taken up in the tact which is required at every machine or process step. The central unit can be seen as a hub which admits waste heat flows and store these flows to thereafter distribute the waste heat without diminishing the energy recovery efficiency.

Figure 2:
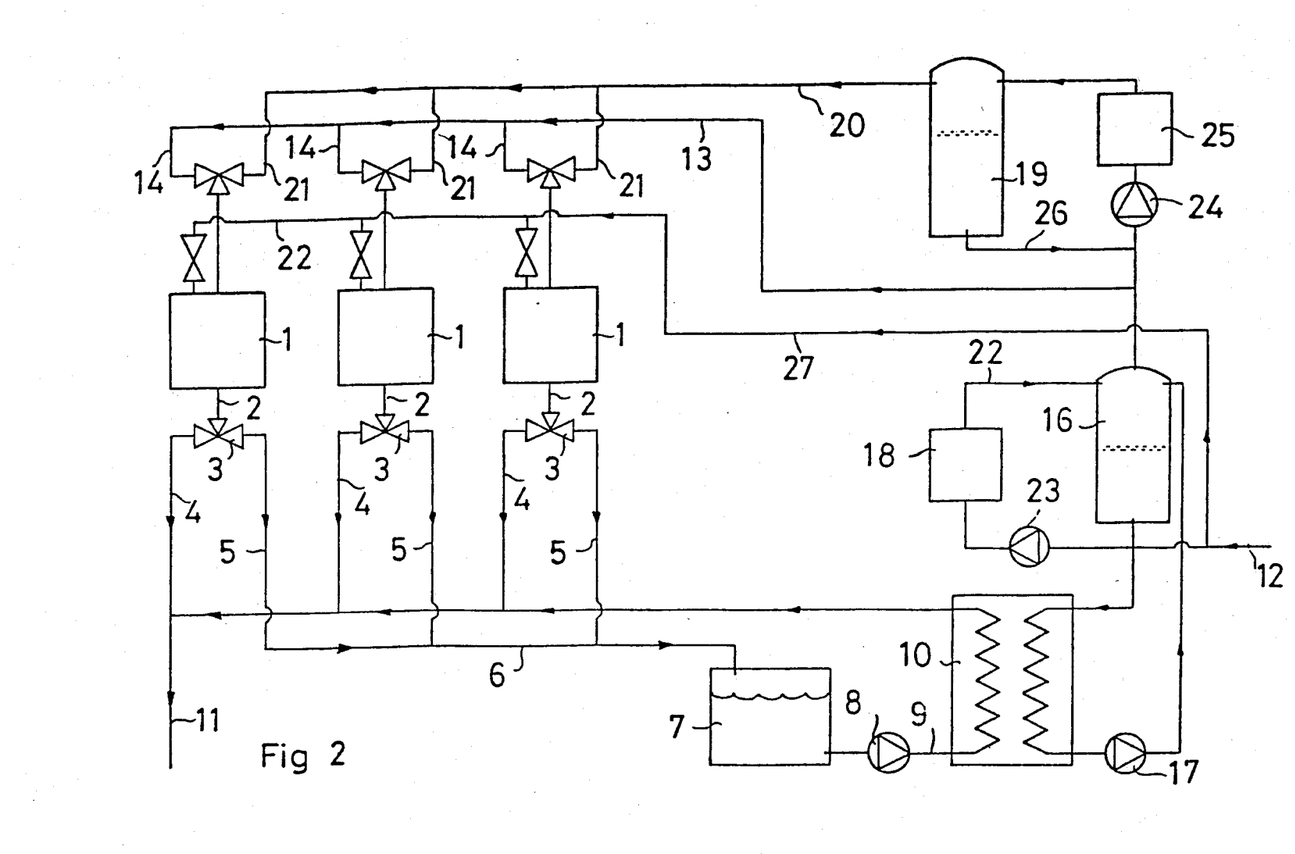
FIG. 2 shows the invention applied on a washing plant.

In FIG. 2 a washing plant is shown which comprises three water washing machines 1. The machines have each an outlet 2 which is connected with three-way valves 3. From each three-way valve is extending on one hand an outlet line 4 which is open out to a final exhaust system 11, and on the other hand a line 5 which is connected with a collecting line 6 which opens to a store tank 7. This tank is via a line 9 which is provided with a pump 8, connected with one side of a heat exchanger 10. The outlet from this side of the heat exchanger is connected with the exhaust 11. The heat exchanger works with counter-current and is with the inlet to its other side connected with the cold water inlet 12 of said plant. The outlet from the other side of the heat exchanger is via a pump 17 connected with the upper part of a bumper tank 16 coupled thereto as a layer accumulator. The bottom of the tank is connected with the cold water inlet 12, and the inlet of the secondary side of the heat exchanger 10.

In FIG. 2 a hot air exhaust over a mangle is shown. At the reference 18 heat is emitted at a relatively low temperature via a line 22 to the upper part of the tank 16. From the lower and cold part of the accumulator tank 16 water is circulated by means of a pump 23 back to the heat source 18 for heating and further transporting to the upper part of the tank.

In the circuit solution shown the heat exchanger 10 and the heat source 18 work in a parallel relationship for the charge of the tank 16.

The upper and hot part of the tank 16 is via a line 13 connected with the washing machines 1. Further, the tank 16 is via a pump 24 and a heat source 25 connected with the upper end of another accumulator tank 19 which also at its hot end has an outlet to a line 20 which via inlet lines 21 is connected with the washing machines 1. The lower and cold part of the tank 19 is via a line 26 connected with the suction side of the pump 24 so that the heat source 25 can charge the accumulator tank 19 with water of proportionately high temperature.

If the heat changer and the heat source 18 emit heat at a highest temperature around 40° C., the accumulator tank 16 will gradually be filled up with water at this temperature. This water is then at the disposal at the inlet to the pump 24, whereafter the temperature increase occurs in the heat source 25 so that the operation temperature in the upper part of the accumulator tank 19 can be at 80° C.

The accumulator tank 19 has an outlet which via the line 20 is connected with the washing machines. The lines are via inlet lines 14 and 21, respectively, connected with the shunt valve, by means of which the temperature in the washing machines 1 can be chosen between the temperature in the tank 16 and the tank 19. Moreover, the washing machines 1 have inlets which via the line 27 are connected with the cold water inlet 12 of the plant so that also the washing machines can be supplied with cold water.

When a washing operation is finished in any of the washing machines 1 and the washing water is to be emitted the temperature of the outlet water from the machine is sensed in proportion to the temperature of the water in the store tank 7. As soon as the temperature of the outlet water with an apt value increases the temperature in the store tank 7 the respective valve 3 is set so that the outlet water is emitted to the storing tank 7 by the lines 5 and 6. If, on the other hand, the outlet water from the washing machine would not have the required temperature the respective valve 3 is set in such a way that the outlet water is transferred by the line 4 to the final exhaust 11. When the hot outlet water is driven from the tank 7 through the heat exchanger 10 by means of the pump 8, heat is transferred from the outlet water to the charge circuit for the tank 16. Hereby, for instance, the outlet water in the tank 7 can, i.e. the water flowing through one of the circuits of the heat exchanger, have an inlet temperature of 50° C. and an outlet temperature of 20° C. Hereby, at the same flows on both sides of the heat exchanger 10, an increase of the temperature is attained on the water possibly coming from the cold water inlet 12 for instance from 13° C. to 43° C. being accordingly the approximately final temperature in the storing tank 16.

Figure 3:
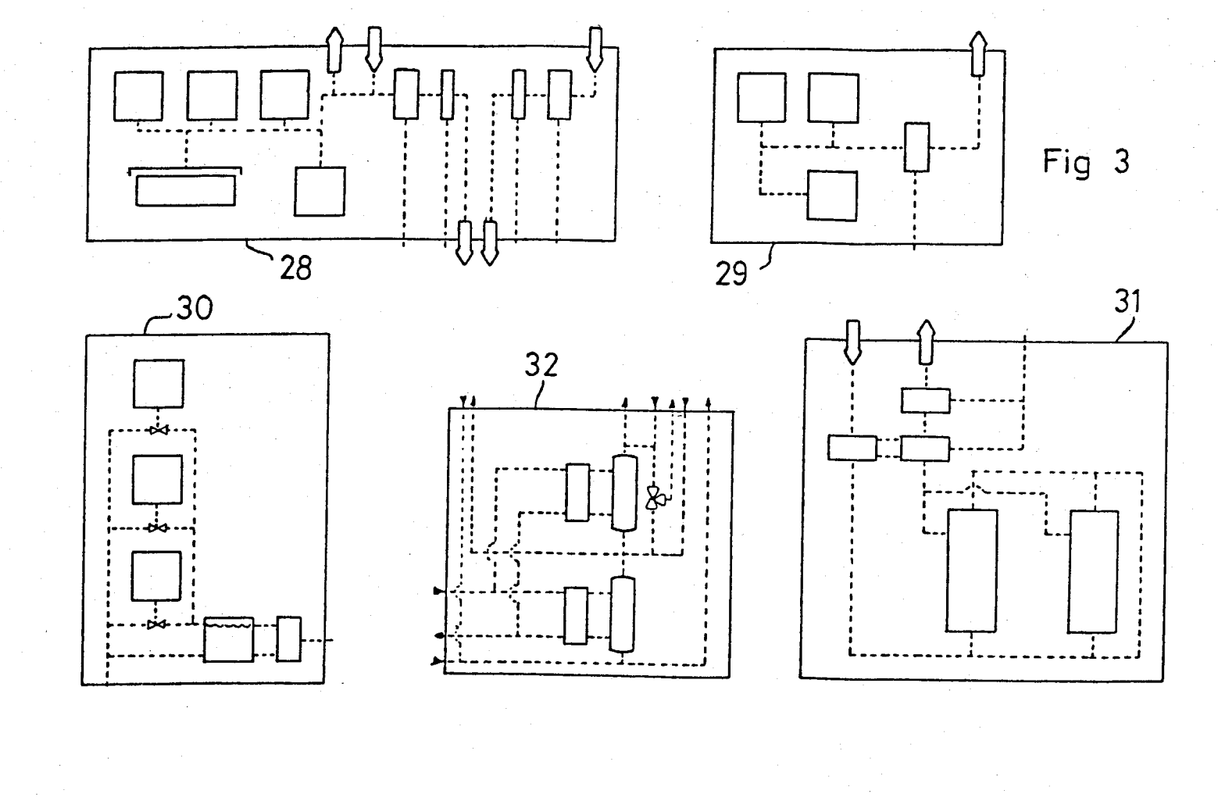
FIG. 3 shows the invention applied to a plant for textile fabrication.

In FIG. 3 a plant for heat recovery within textile industry is shown. This plant comprises an air treatment and a conditionary unit 28 which is provided to make use of air carried heat at low temperature of the order of 35°–45° C., and to use it to temper the local supply air which is given a proportionately high relative humidity to diminishing the problems with static electricity. In this unit an apparatus is included which without heat recovery provides said treatment.

In the plant is further included a number of drying machines from which air is emitted at about 85° C., said heat being recovered and derived for use at another place in the plant.

In connection with the drying unit 29 a dyeing and washing unit 30 is also placed which, however, in FIG. 3 is separated from the drying unit 29. In the dyeing and washing unit 30 waste water is emitted at varying temperatures, wherefore an assorting device is comprised which derives water on one hand to the outlet and on the other hand to a heat recovery device.

The plant comprises also a machine unit 31 with dressing tenters from which heated air is emitted in great flows at about 150° C. In this unit local heat exchange occurs between consumed air and fresh air which is supplied from the surrounding environment.

Finally, the plant of FIG. 3 comprises a central unit 32 including two as layer accumulators coupled bumper tanks working at different temperatures, and further two heat exchangers which supply the plant the net energy which cannot be recovered.

Figure 4:
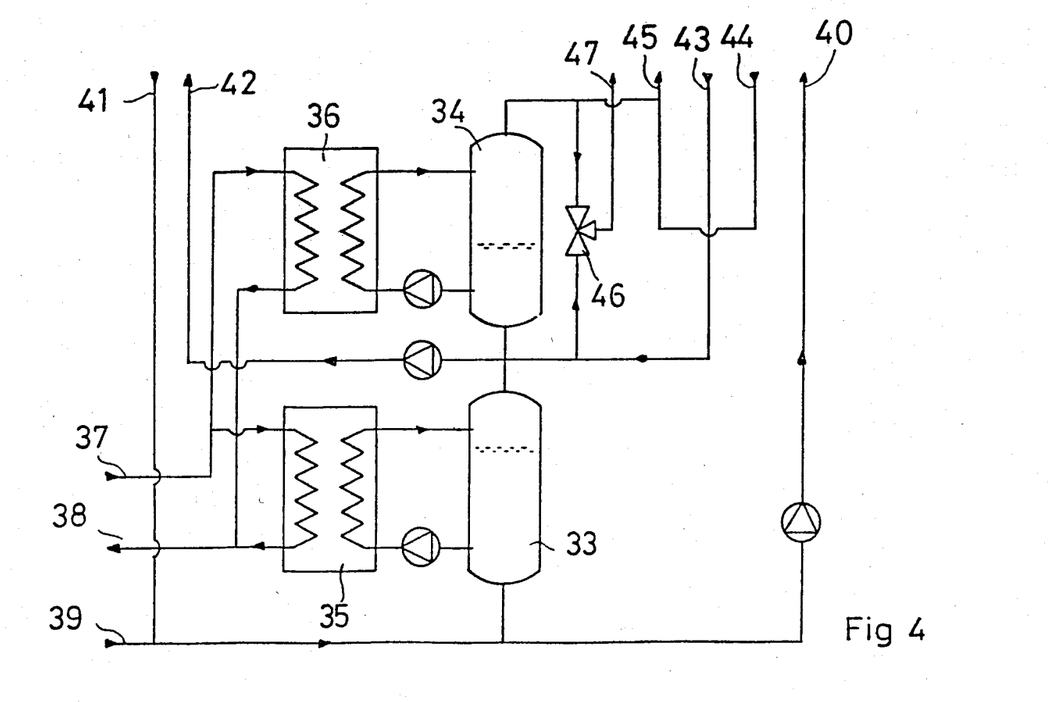
FIG. 4 shows the invention applied on the circuit solution of the central unit included in the plant of FIG. 3.

In FIG. 4 a simplified circuit solution within the central unit is shown. The references 33 and 34 denote the bumper tanks which are coupled as layer accumulators of which the tank 33 works in a lower and the tank 34 in a upper temperature interval. Vapour heat exchangers 35 and 36 are coupled to both the bumper tanks. Said vapour heat exchangers 35 and 36 are coupled in parallel relationship between an vapour inlet 37 and an outlet 38 for condensate or lower pressure vapour. Further, the central unit has an inlet 39 for cold water which is connected with both a cold water outlet 40 and an inlet 41 which is connected with the low temperature end of the layer accumulator 33. The hot end of the layer accumulator 33 is connected with both an outlet 42 and an inlet for recovered low temperature heat. Finally, the upper end of the accumulator tank 33 is connected with the lower end of the accumulator tank 34.

The central unit has moreover an inlet 44 for recovered high temperature heat and a corresponding outlet 45 for the emitting of high temperature heat. Both these connections are in flow connection with the upper and hottest end of the layer accumulator 34 of FIG. 4. An outlet 47 for hot water is also coupled in parallel relationship over this accumulator 34 by a shunt valve 46, said temperature being in this way able to be set by way of the shunt valve.

The connection of the central unit as described above admits that recovered heat in a lower temperature range both can be emitted directly from the central unit and can be used for charging of the lower accumulator tank 33, whereby this is able dependent on the time to compensate the supply and the demand on the recovered heat. In the same way recovered heat in high temperature interval can be used on one hand directly and on the other hand for charging of the layer accumulator 34, which accordingly provides for a compensation dependent on the time of the supply and the need of heat within the upper temperature interval. Further, it is possible to feed the plant with an additional net supply of heat energy to the plant by means of the heat exchangers 35 and 36.

Figure 5:
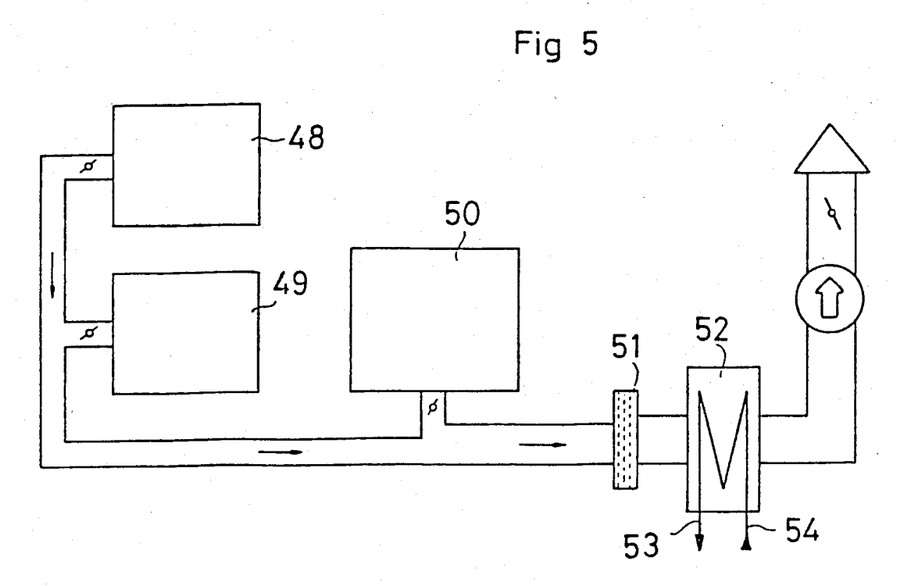
FIG. 5 shows the circuit solution for a bleachery and a dye house included in the plant of FIG. 3.

In FIG. 5 the circuit solution for the drying unit 29 of FIG. 3 is shown. It can be seen that the machine group comprises drying devices 48, 49 and 50, which emit flows of heated air at about 85° C. This air is conducted through a filter 51 and through a heat exchanger 52 to recover the heat carried of the air. The outlet 53 of the heat exchanger 52 is by means of lines connected with the low temperature inlet 43 of the central unit, see FIG. 4, while the inlet of the heat exchanger 52 is connected with the cold water outlet 40 of the central unit, see FIG. 4.

Figure 6:
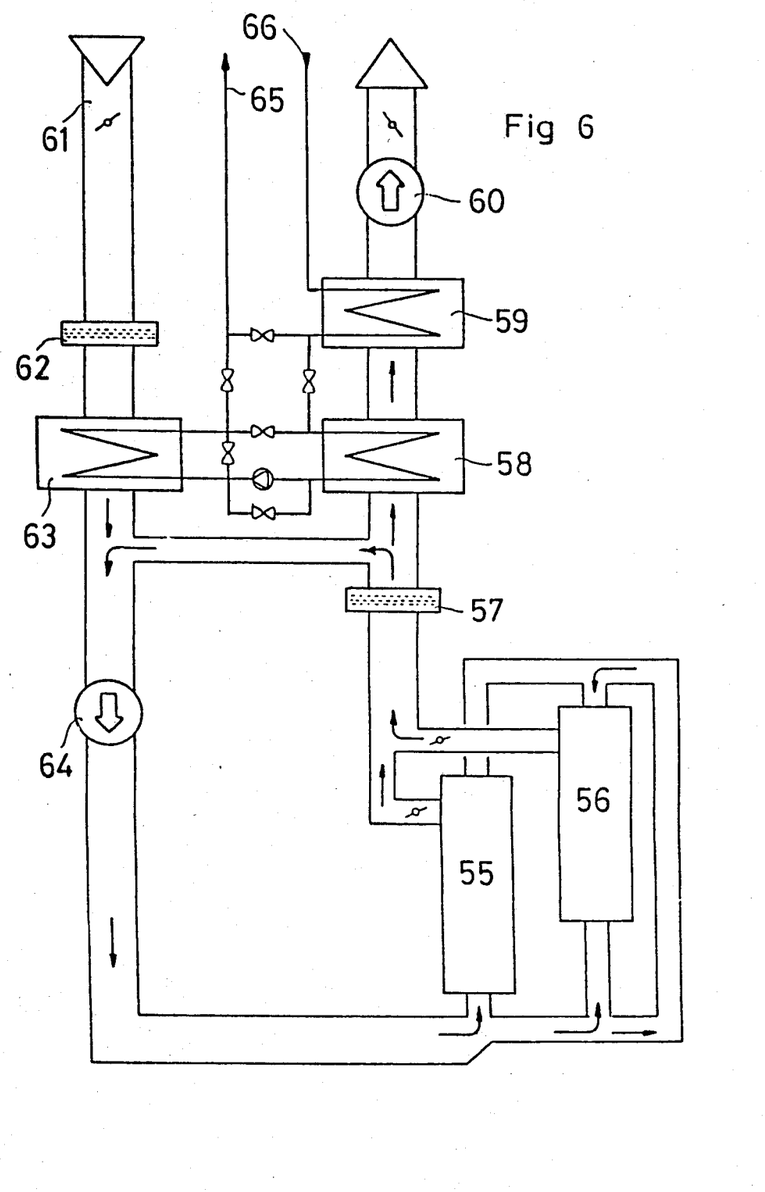
FIG. 6 shows the circuit solution at dressing tenters included in the plant of FIG. 3.

In FIG. 6 the unit 31 with the dressing tenters is shown. These machine units have the references 55 and 56. From these machine units great volume flows of air heated to a relatively high temperature, about 150° C., are emitted. The heated air emitted from the dressing tenters passes through a filter 57, and then through a first heat exchanger 58, and thereafter through a second heat exchanger 59, and is driven of a fan 60 to an air outlet which preferably is provided outdoors. Moreover, this machine unit comprises a fresh air inlet 61 from which air is conducted via a filter 62 to a heat exchanger 63 and is driven of a fan 64 to the inlet sides of the dressing tenters 55 and 56.

The heat exchanger 58 is coupled so that heat is emitted to the heat exchanger 63, whereby a local heat exchange occurs between emitted and supplied air flows. Surplus heat from the heat exchangers 58 and 59 is emitted via an outlet 65 to the inlet 44 of the central unit, see FIG. 4, for high temperature heat, while the inlet 66 is connected with the outlet 40 of the central unit for cold water.

Figure 7:
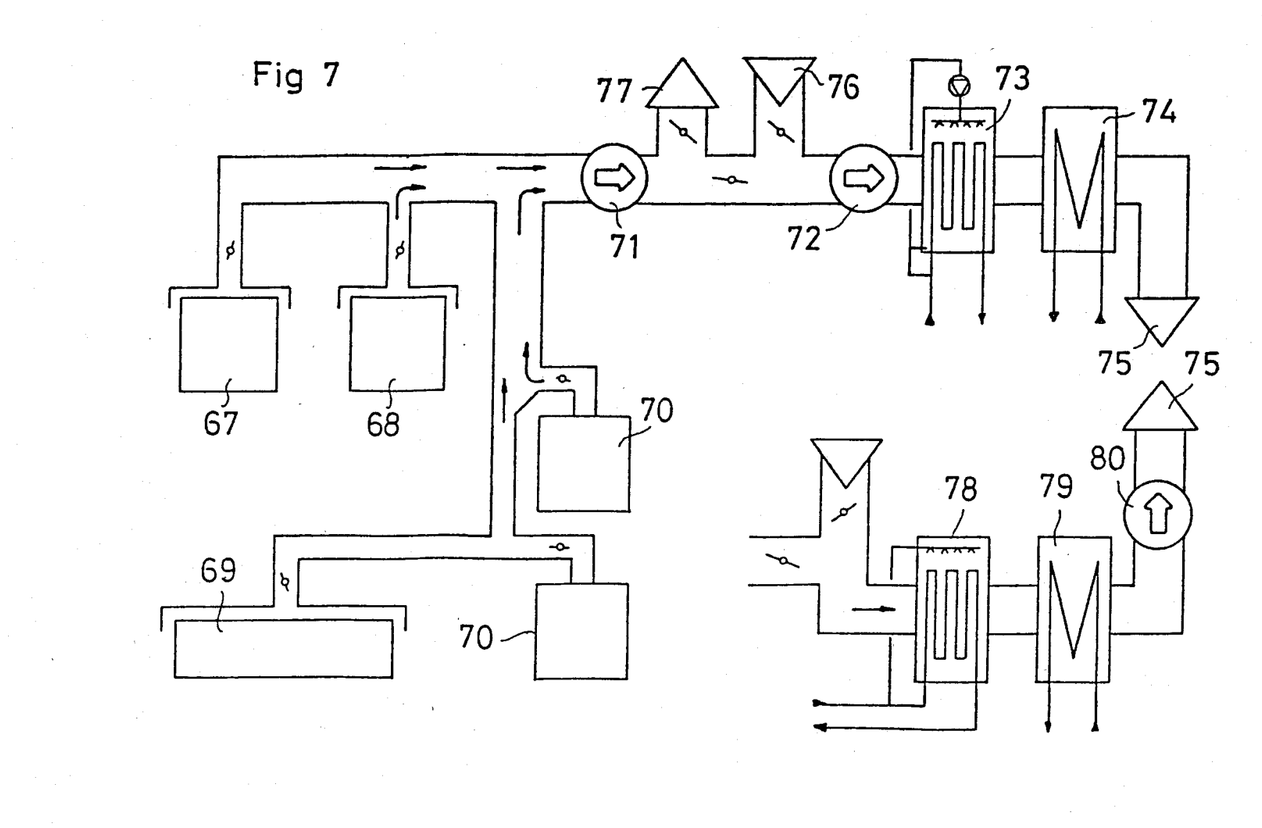
FIG. 7 shows the circuit solution for an air supporting and conditioning unit included in the plant of FIG. 3.

In FIG. 7 the circuit solution for the air treatment unit 28 of FIG. 3 is shown. This unit comprises hot air producing machines 67, 68, 69 and 70, said hot air being emitted at a low temperature, of the order of 35°-50° C. The emitted output air includes certain contaminations due to which this air cannot be used directly as local input air. The so somewhat contaminated air is driven by two fans 71 and 72 in a scrubber unit 73 in which contaminations are removed simultaneously as the relative humidity in the air is increased strongly. Due to the evaporation of injected water in the scrubber unit heat is consumed which firstly is taken from the air stream, whereby the temperature thereof is lowered. For the treated air to get an apt temperature as local supply air additional heat is supplied as desired into a heat exchanger 74 which is connected downstreams of the scrubber unit 73. From the heat exchanger 74 the air then is emitted through an outlet.

Between both fans 71 and 72 are provided an air inlet 76 and an air outlet 77, whereby a part of the consumed outlet air can be blown out while a corresponding volume fresh air is supplied at the suction side of the fan 72.

Besides the units described above the air treatment unit 28 of FIG. 3 comprises a component group, shown in FIG. 7, with an air humidifying device 78, a heat exchanger 79 and a fan 80. The function of these components is analogous to the description of the components 72, 73 and 74.

Since the temperature which is required at the energy supply to the air humidifying unit is low, the inlet is connected with the outlet 42, see FIG. 4, on the central unit, while the outlet from the air treatment unit 28 is connected with the inlet 41. During summer operation with high air temperature outdoors it can be necessary instead for supplying heat to the heat exchangers 74 and 79 to provide a cooling operation, in which the flow direction in the line between the air treatment unit 28 and the inlet 41 of the central unit is reversed.

In the embodiment of FIG. 2 the washing machines 1 can for instance be considered to correspond to the units $M_1$ and $M_3$ of FIG. 1, while the heat sources 18 and 25 correspond to the units $M_2$ and $M_4$. In this analogy the three tanks 7, 16 and 19 of FIG. 2 corresponds to the accumulators $A_1$, $A_2$ and $A_3$, while the cold water inlet 12 corresponds to the inlet IN. The fixed connection between the heat sources 18 and 25 of FIG. 2 corresponds in FIG. 1 to a part of the change-over device $O_1$, while the active connection of FIG. 2 of the washing machines 1 and the storing tank 7 corresponds to an active part of the change-over device 1. In the same way the shunt valves at the inlet lines 14 and 21 corresponds to the change-over device $O_2$ which is this analogy is active.

The invention can be modified within the scope of the invention.

I claim:

1. A method for the recovery of waste heat with a heat recovery system from a plurality of heat carrying fluids in a heat consuming plant having a plurality of waste heat sources and at least one heat consuming unit, each of said heat carrying fluids from each of said waste heat sources having a different temperature, comprising the steps of:

classifying said heat carrying fluids according to the temperatures thereof;

supplying said heat carrying fluids having approximately the same temperature to a heat exchanger for transferring the waste heat from said heat carrying fluids to a heat absorbing fluid associated with said heat exchanger;

storing said heat absorbing fluid associated with said heat exchanger in a heat accumulator at a temperature as high as possible and compatible with the thermodynamic characteristics of said heat recovery system; and supplying said heat absorbing fluid from said heat accumulator to said heat consuming unit having a temperature requirement compatible with the temperature of said heat absorbing fluid.

2. The method of claim 1; wherein said heat recovery system includes a second heat exchanger and a second heat accumulator having a second heat absorbing fluid, said second heat exchanger for extracting heat from said waste heat sources having temperatures higher than said temperature of the first-mentioned heat absorbing fluid; and further comprising the step of supplying said first heat absorbing fluid from the first-mentioned heat accumulator to said second heat accumulator.

3. The method of claim 2; wherein said step of supplying said heat absorbing fluid comprises supplying said second heat absorbing fluid to said heat consuming unit.

4. The method of claim 3; and further comprising the step of supplying said second heat absorbing fluid to said second heat exchanger before said step of supplying said second heat absorbing fluid to said heat consuming unit.

5. The method of claim 1; wherein said heat recovery system includes a plurality of heat exchangers, each with a heat absorbing fluid and each receiving said heat carrying fluids having approximately the same, preset temperature; and wherein the step of supplying said heat carrying fluids includes supplying each of said heat carrying fluids having approximately said predefined temperature to the corresponding heat exchangers.

6. The method of claim 5; wherein said heat consuming plant includes a plurality of heat consuming units, each with a predefined temperature requirement; and wherein the step of supplying said heat absorbing fluid comprises supplying each of said heat absorbing fluids having approximately said predefined temperatures to the corresponding heat consuming unit.

* * * * *